United States Patent [19]

Sacks

[11] Patent Number: 4,702,528
[45] Date of Patent: Oct. 27, 1987

[54] RESIN-AUGMENTATION OF PIN-ASSEMBLY FOR EXTRUDED, ANODIZED WHEEL RIMS

[75] Inventor: Martin B. Sacks, Claypool, Ind.

[73] Assignee: Sun Metal Products, Inc., Warsaw, Ind.

[21] Appl. No.: 735,594

[22] Filed: May 20, 1985

[51] Int. Cl.⁴ ............................................. B60B 21/02
[52] U.S. Cl. ....................................... 301/99; 403/292
[58] Field of Search ........................ 301/95, 96, 99, 97, 301/98; 152/383; 403/266–268, 292, 298

[56] References Cited

U.S. PATENT DOCUMENTS 3,756,635 9/1973 Beers ................................ 403/292 X
4,141,554 2/1979 Sherwin .......................... 403/292 X

FOREIGN PATENT DOCUMENTS 564813 10/1958 Canada ................................. 403/298
2308719 9/1973 Fed. Rep. of Germany ........ 301/99
1012980 7/1952 France ................................. 301/99

OTHER PUBLICATIONS

"Rims", by John S. Allen, dated Sep. 1983, *American Bicyclist and Motorcyclist*, pp. 29–32, 74–77.

*Primary Examiner*—David A. Scherbel

[57] ABSTRACT

The invention comprises a cured-in-place resin augmentation of the pin assembly of extruded, anodized, bicycle wheel rims and the like.

5 Claims, 4 Drawing Figures

U.S. Patent  Oct. 27, 1987  4,702,528
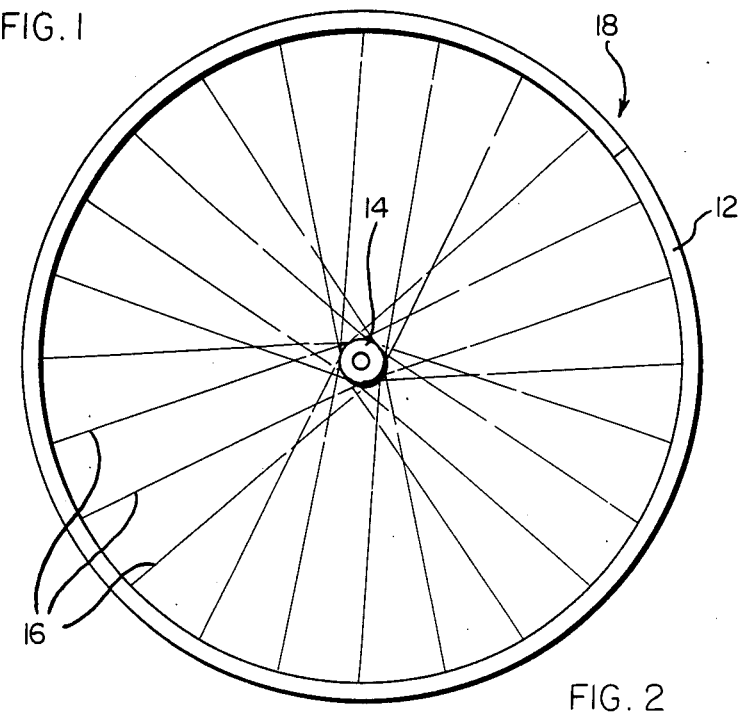
FIG. 1
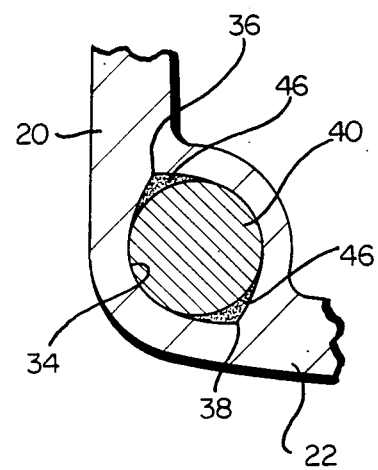
FIG. 4
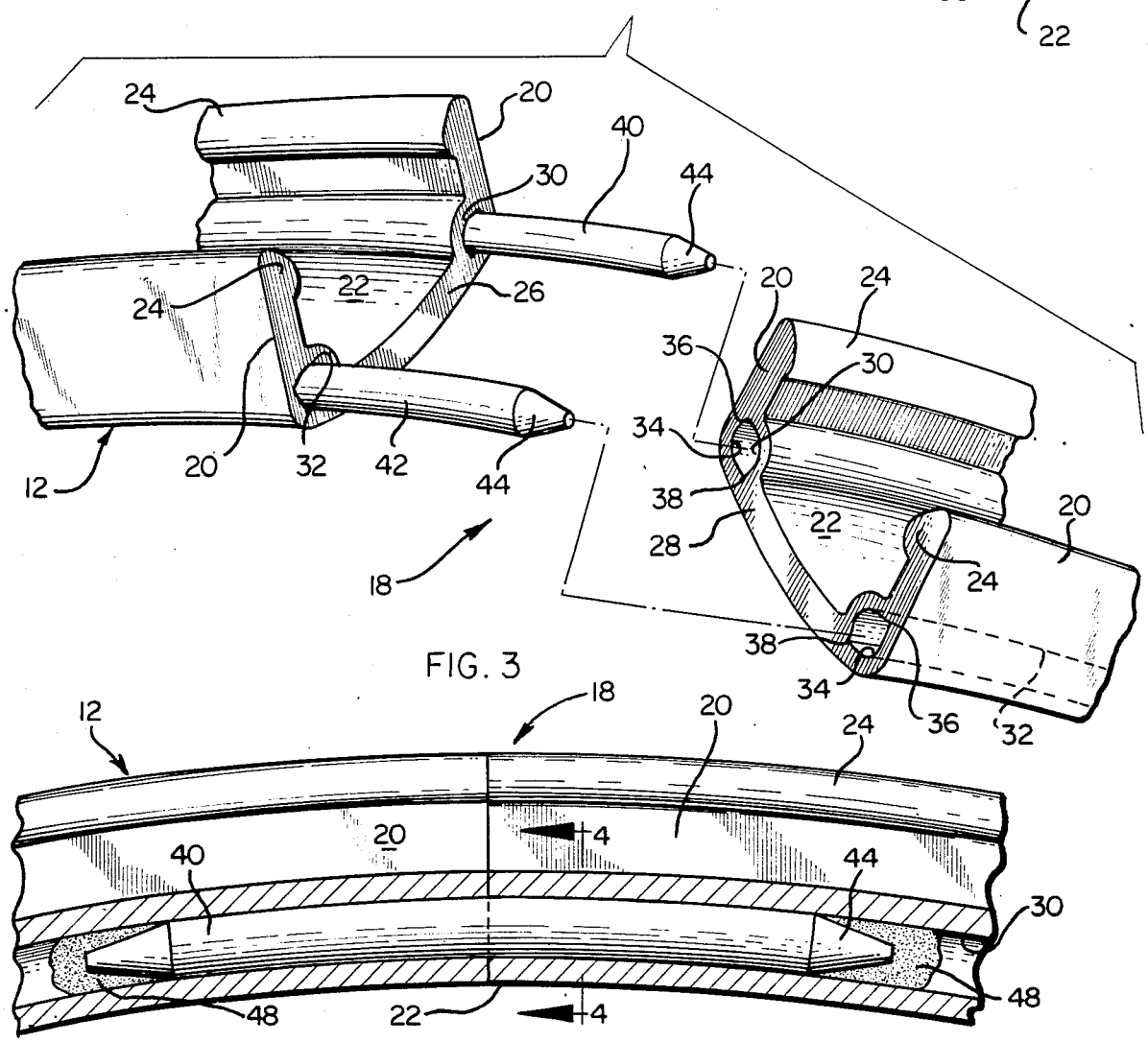
FIG. 2
FIG. 3

RESIN-AUGMENTATION OF PIN-ASSEMBLY FOR EXTRUDED, ANODIZED WHEEL RIMS

FIELD OF THE INVENTION

This invention relates generally to the manufacture and assembly of lightweight wheel rims and relates more particularly to improved structures for interconnecting the ends of aluminum alloy wheel rim extrusions for bicycles and the like.

BACKGROUND OF THE INVENTION

Because of their weight economy, strength, and stylishness, aluminum alloy extrusions have grown in popularity for the wheel rims of racing, touring and special event bicycles; and one widely used prior art scheme for interconnecting the cut ends of a rim extrusion has employed a pair of solid steel pins which are force-fit into the confronting ends of spaced-apart tubulations extruded into the rim cross-section. It has also been common practice heretofore to provide the tubulations with a non-round shape, such as triangular or elliptic, in order to avoid or ameliorate the creation of unsightly bulges on the rim sidewalls where the pins are pressed into the tubulations. However, the round pins do not fit completely into such tubulations, leaving one or more narrow channels communicating past the pins and into the annular spaces of the tubulations. Anodizing solutions applied to the completed rim after assembly have been found to invade the tubulations through these channels during chemical processing and to leak out later in retrograde flow. Unsightly staining of the anodized finish has resulted; and this has proved especially objectionable with regard to intense-color anodizations such as black, gold, red or blue treatments.

BRIEF DESCRIPTION OF THE INVENTION

The present invention solves the problem of anodizing chemicals and the like invading the tubulations of an extruded rim through the connecting joint therein and, in a preferred embodiment, provides a double sealant barrier against such liquid chemicals, as well as a joint of enhanced strength. Specifically, the present invention contemplates the formation in situ of a cured resin augmentation of the pin assembly of extruded, anodized wheel rims and the like.

Accordingly, a general object of the present invention is to provide a new and improved connecting joint for lightweight wheel rims.

Another object of the invention is to provide a strength-enhancing, liquid-barrier joint for such wheel rims.

Other objects and features of the invention pertain to the particular structures and materials by which the foregoing objects are attained.

BRIEF DESCRIPTION OF THE DRAWING

The invention, both as to its construction and its mode of fabrication, will be better understood by reference to the following disclosure and drawing forming a part thereof, wherein:

FIG. 1 is a side elevational view of a lightweight bicycle wheel assembly incorporating a rim joint construction fashioned in compliance with the present invention, the wheel assembly being shown with the tire demounted;

FIG. 2 is an enlarged, exploded perspective view showing the interconnecting joint construction used in the rim of the wheel assembly of FIG. 1;

FIG. 3 is a further enlarged, side elevational view of the joint construction of FIG. 2 in its completed form; and FIG. 4 is a still further enlarged view taken in cross-section substantially along the Line 4—4 of FIG. 3.

DETAILED DESCRIPTION OF THE INVENTION

In accordance with conventional practice, and with reference to FIG. 1, a lightweight bicycle wheel assembly indicated generally by the reference numeral 10 comprises a circular rim 12, a journalled hub 14, and a suitable number of wire spokes 16 which are tightly laced or tensioned between the hub 14 and the rim 12. The rim 12 is adapted to receive a rubber tire body or casing and is specifically fabricated as an aluminum alloy extrusion, the opposite ends of which are connected by a joint 18.

Turning to FIG. 2, the rim 12 is fashioned with a channel-shaped section and includes a pair of spaced, annular sidewalls 20 which are connected by an integral, annular root wall or floor 22. In addition, each of the spaced sidewalls 20 terminates in a bulbous edge or bead 24 to assist in mounting the tire body to the rim.

The aluminum alloy extrusion which defines the rim 12 is cut and trimmed to define a pair of end faces 26 and 28 which are abutted or confronted in making the joint 18. Furthermore, the extrusion is fabricated with spaced, continuous tubulations 30 and 32 which extend generally in a direction away from the end faces 26 and 28 and which are positioned respectively at the intersections of the sidewalls 20 and the root wall 22. In the practice of the present invention, the tubulations are fashioned with matching, non-round cross-section including a generally circular mid-portion 34, which defines a pin-receiving bore, and with one or more apical portions open to the mid-portion and extending radially outwardly of the mid-portion to define a channel that is open longitudinally to the pin-receiving bore. In the illustrated embodiment, the cross-section of the tubulations 30 and 32 specifically includes diametric, apical portions 36 and 38.

In forming the interconnecting joint 18 in the rim 12, a pair of solid pins 40 and 42 are force-fit into the tubulations 30 and 32 respectively; and a pin-to-aperture interference, of from about 0.005 to about 0.007 inches has proved useful in this regard. To lead the pins 40 and 42 into the tubulations 30 and 32, conically tapered tips 44 are provided on the ends of the pins.

In compliance with the features of the present invention and with reference to FIGS. 3 and 4, a quantity 46 of polymeric resin is cured in both of the apical channels 36 and 38, adhesively attached to the walls of the channel and to the confronting side surface of the pin 40, as is best seen in FIG. 4. Furthermore, quantities 48 of polymeric resin are cured in the tubulations 30 and 32 at the respective ends of the pins 40 and 42, adhesively attached to the walls of the tubulation and to the respective ends of the pin, effectively plugging the tubulations. Advantageously, the quantities 46 and 48 of polymeric resin are confluent to form an integral mass; and in compliance with the present invention, the polymeric resin is specifically selected to be an epoxy resin adhesive.

The epoxy resin adhesive which is employed in the present invention is characterized by good adherence to all metals and to hard plastics, as represented by a bond strength of at least about 1500 p.s.i.; by a usable pot life in excess of one-half hour at room temperature; and especially by being thixotropic in the as-mixed, uncured state, with a creamy or buttery consistency that promotes positive placement in the open ends of the rim tubulations 30 and 32. For this purpose, a two-part, room temperature curing, epoxy formulation is usefully employed; and one eminently suitable product in this regard is the two-part epoxy system comprising bisphenol A and epichlorohydrin and an amine-type curing agent which is sold by Armstrong Products Company of Warsaw, Ind., under the trade designation "Armstrong A-31".

In accord with the method aspects of the present invention, a predetermined amount of the selected polymeric resin material is first inserted, in its uncured state, into the open ends of the tubulations 30 and 32, closely adjacent the corresponding end faces 26 and 28. Next, the pins 40 and 42 are forced into tubulations, extruding the resin material into the channels 36 and 38 and forming a plug of the resin material in the tubulations at the pin tips 44, as is shown in FIG. 3. Thereafter, the resin material is cured either at room temperature or by the application of mild heat, at 165° F. for example, the resin forming a strong adhesive bond with each of the metal surfaces that it contacts, hermetically sealing the joint 18. It is to be appreciated that the thixotropic nature of the uncured resin material preserves its selected, initial placement in the ends of the tubulations and promotes its subsequent extrusion into the channels 36 and 38 and into a plug-like mass at the tips of the pins 40 and 42.

After the resin has cured, the rim is ready for assembly with the hub 14 and the spokes 16; and it has been found that the joint 18 of the present invention, not only is strong enough to withstand radially outward spoke-lacing forces, but effectively resist invasion by liquid chemicals in subsequent anodizing processes.

The drawing and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. In a circular wheel rim having confronting end faces and aligned tubulations extending away from said faces with pin means force-fit into said tubulations, said tubulations being of matching, non-round cross-section including a generally circular mid-portion defining a bore snugly receiving a said pin means and including at least one apical portion open to said mid-portion and extending radially outwardly of said mid-portion to define a channel open longitudinally to the side surface of said pin means, the improvement comprising: first ploymeric resin means cured in said channel and adhesively attached to the walls of said channel and to the confronting side surface of said pin means; and second and third polymeric resin means cured in said tubulation at the respective ends of said pin means and adhesively attached to the walls of said tubulation and to the respective ends of said pin means; said resin means forming a fluid seal in said tubulation preventing migration of fluids into said tubulation.

2. The improvement according to claim 1 wherein said first, second and third polymeric means are confluent to form an integral mass.

3. The improvement according to claim 1 wherein said polymeric means comprise epoxy resin.

4. The method of making a joint in a circular wheel rim having confronting end faces and aligned tubulations extending away from said faces with pin means force-fit into said tubulations, said tubulations being of matching non-round cross-section including a generally circular mid-portion defining a bore snugly receiving a said pin means and including at least one apical portion open to said mid-portion and extending radially outwardly of said mid-portion to define a channel open longitudinally to the side surface of said pin means, said method comprising the steps of: inserting a selected amount of an uncured polymeric resin material into the open end each of said tubulations closely adjacent the corresponding end faces of said rim; forcing said pin means into said aligned tubulations to extrude said resin material into said channel and into the tubulations adjacent the ends of said pin means so that said tubulations provide a sealing means restricting fluid movement through said tubulations; and curing said polymeric resin material in place and into adhesive attachment with the wall of said channel, the respective ends of and the side surface of said pin means confronting said channel, and to the wall of said tubulations adjacent the ends of said pin means.

5. The method according to claim 4 wherein said polymeric resin material is thixotropic in its uncured state.

* * * * *